(12) United States Patent
Mi et al.

(10) Patent No.: US 11,997,027 B2
(45) Date of Patent: May 28, 2024

(54) SIGNAL SENDING METHOD, SIGNAL RECEIVING METHOD, AND APPARATUS (71) Applicant: Huawei Technologies Co., Ltd., Shenzhen (CN)

(72) Inventors: Xiang Mi, Beijing (CN); Xiaolei Tie, Shanghai (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 456 days.

(21) Appl. No.: 17/095,523

(22) Filed: Nov. 11, 2020

(65) Prior Publication Data
US 2021/0067286 A1 Mar. 4, 2021

Related U.S. Application Data (63) Continuation of application No. PCT/CN2018/086590, filed on May 11, 2018.

(51) Int. Cl.
*H04W 4/00* (2018.01)
*H04L 5/00* (2006.01)

(52) U.S. Cl.
CPC .......... *H04L 5/0007* (2013.01); *H04L 5/0048* (2013.01); *H04L 5/0053* (2013.01)

(58) Field of Classification Search
CPC ... H04L 5/0007; H04L 5/0048; H04L 5/0053; H04W 52/0229; H04W 76/28; Y02D 30/70; H04J 13/0062; H04J 13/0074
See application file for complete search history.

(56) References Cited

U.S. PATENT DOCUMENTS

| 2011/0228748 A1* | 9/2011 | Han | H04B 7/0689 |
| | | | 370/335 |
| 2017/0093540 A1* | 3/2017 | Lei | H04J 11/0069 |

(Continued)

FOREIGN PATENT DOCUMENTS

| CN | 106413061 A | 2/2017 |
| CN | 106685614 A | 5/2017 |

(Continued)

OTHER PUBLICATIONS

"Wake-up signal for NB-IoT and eMTC," 3GPP TSG-RAN WG2 #99bis, Prague, Czech Republic, R2-1710749, pp. 1-8, 3rd Generation Partnership Project, Valbonne, France (Oct. 9-13, 2017).

(Continued)

*Primary Examiner* — Atique Ahmed
(74) *Attorney, Agent, or Firm* — Leydig, Voit & Mayer, Ltd.

(57) ABSTRACT

A signal sending method, a signal receiving method, and an apparatus are provided. The method includes: A network device generates a first sequence, where the network device maps the first sequence to the last 11 orthogonal frequency division multiplexing OFDM symbols in a first subframe, and maps, to the first M OFDM symbols in the first subframe sequentially, a second sequence that belongs to the first sequence, where the second sequence is a sequence that is mapped to M OFDM symbols in a last N OFDM symbols of the first subframe, N is greater than or equal to M, N is an integer greater than 0 and less than 12, and M is an integer greater than 0 and less than 4; and the network device sends the first subframe.

18 Claims, 7 Drawing Sheets

(56) References Cited

U.S. PATENT DOCUMENTS

| | | | |
|---|---|---|---|
| 2017/0288848 A1* | 10/2017 | Lei | H04L 7/0054 |
| 2017/0317816 A1* | 11/2017 | Lei | H04L 7/041 |
| 2018/0019902 A1 | 1/2018 | Suh et al. | |
| 2018/0184390 A1* | 6/2018 | Wu | H04L 27/2613 |
| 2018/0248735 A1* | 8/2018 | Zhang | H04L 5/005 |
| 2018/0287844 A1* | 10/2018 | Kim | H04L 5/005 |
| 2019/0268205 A1* | 8/2019 | Shin | H04L 27/2675 |
| 2020/0029302 A1* | 1/2020 | Cox | H04W 68/02 |

FOREIGN PATENT DOCUMENTS

| | | |
|---|---|---|
| EP | 3734925 A1 | 11/2020 |
| WO | 2018010643 A1 | 1/2018 |
| WO | 2018017005 A1 | 1/2018 |
| WO | 2018059488 A1 | 4/2018 |
| WO | 2019055419 A1 | 3/2019 |
| WO | 2019147088 A1 | 8/2019 |

OTHER PUBLICATIONS

"3rd Generation Partnership Project; Technical Specification Group Radio Access Network; Evolved Universal Terrestrial Radio Access (E-UTRA); Physical channels and modulation (Release 15)," 3GPP TS 36.211 V15.1.0, pp. 1-222, 3rd Generation Partnership Project, Valbonne, France (Mar. 2018).

"Detailed design of wake-up signal for NB-IoT," 3GPP TSG-RAN WG1 Meeting #91, Reno, Nevada, R1-1719357, pp. 1-10, 3rd Generation Partnership Project, Valbonne, France (Nov. 27-Dec. 1, 2017).

"3rd Generation Partnership Project; Technical Specification Group Radio Access Network; Evolved Universal Terrestrial Radio Access (E-UTRA); Physical layer procedures (Release 15)," 3GPP TS 36.213 V15.1.0, pp. 1-501, 3rd Generation Partnership Project, Valbonne, France (Mar. 2018).

"Support for TM DRB," 3GPP TSG-RAN WG2 #101bis, Sanya, China, R2-1805995, p. 1, 3rd Generation Partnership Project, Valbonne, France (Apr. 16-20, 2018).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.6.2, pp. 1-766, 3rd Generation Partnership Project, Valbonne, France (Apr. 2018).

Huawei, HiSilicon, "On detailed design and evaluations of power saving signal," 3GPP TSG RAN WG1 Meeting #92bis, Sanya, China, R1-1803868, total 19 pages, 3rd Generation Partnership Project, Valbonne, France (Apr. 16-20, 2018).

MediaTek Inc., "Wake Up Signal Design for NB-IoT," 3GPP TSG RAN WG1 Meeting #92bis, Sanya, China, R1-1804140, total 6 pages, 3rd Generation Partnership Project, Valbonne, France (Apr. 16-20, 2018).

MCC Support, "Draft report of 3GPP TSG RAN WG1#92bis v0.2.0 (Sanya, China, Apr. 16-20, 2018)," 3GPP TSG RAN WG1 Meeting #93, Busan, South Korea, R1-180xxxx, total 192 pages, 3rd Generation Partnership Project, Valbonne, France(May 21-25, 2018).

Qualcomm Incorporated, "Comparison of WUS sequence design," 3GPP TSG RAN WG1 Meeting #91, Reno, USA, R1-1720424, Total 10 pages, 3rd Generation Partnership Project, Valbonne, France (Nov. 27-Dec. 1, 2017).

ZTE, Sanechips, "Summary of remaining issues of DL aspects for TDD NB-IoT," 3GPP TSG RAN WG1 Meeting #92, Athens, Greece, R1-1803144, Total 8 pages, 3rd Generation Partnership Project, Valbonne, France (Feb. 26-Mar. 2, 2018).

ZTE, Sanechips, "Summary of DL aspects for TDD NB-IoT," 3GPP TSG RAN WG1 Meeting #92bis, Sanya, China, R1-1805312, Total 24 pages, 3rd Generation Partnership Project, Valbonne, France (Apr. 16-20, 2018).

Huawei et al., "Consideration and evaluation on power saving signal in NB-IoT," 3GPP TSG RAN WG1 #90, Prague, Czech Republic, R1-1712113, Total 15 pages (Aug. 21-25, 2017).

Huawei et al., "Feature lead summary on detailed design of Wake-up signal in NB-IoT," 3GPP TSG RAN WG1 #92bis, Sanya, China, R1-1805290, Total 9 pages (Apr. 16-20, 2018).

* cited by examiner

SIGNAL SENDING METHOD, SIGNAL RECEIVING METHOD, AND APPARATUS

CROSS-REFERENCE TO RELATED APPLICATIONS

This application is a continuation of International Application No. PCT/CN2018/086590, filed on May 11, 2018, the disclosure of which is hereby incorporated by reference in its entirety.

TECHNICAL FIELD

This application relates to the field of wireless communications technologies, and in particular, to a signal sending method, a signal receiving method, and an apparatus.

BACKGROUND

In a narrowband internet of things (NB-IoT) system, a network device periodically sends a paging signal to indicate whether a terminal device needs to switch from idle mode to connected mode, to exchange service data with the terminal device. The terminal device in the idle mode periodically wakes up to detect a paging signal. A cycle in which the terminal device periodically wakes up is referred to as a discontinuous reception (DRX) cycle, and a location at which the terminal device wakes up is referred to as a paging occasion (PO). The terminal performs blind detection in a search space starting from the PO location. If a narrowband physical downlink control channel (NPDCCH) is blindly detected, it is determined that the terminal needs to switch to connected mode; otherwise, the terminal remains in idle mode. In actual application, a probability that the network device pages the terminal device is generally quite low. Therefore, the terminal device does not blindly detect the NPDCCH in most DRX cycles, resulting in an increase in power consumption of the terminal device.

To resolve this problem, in the NB-IoT system, the network device sends a paging indication signal before the PO location, to indicate whether the terminal device needs to wake up at the PO location. Currently, a type of the paging indication signal under discussion is mainly WUS/DTX, the WUS refers to a wake-up signal, and the DTX refers to discontinuous transmission. When there is the NPDCCH on the PO, the network device sends the WUS before the PO. When there is no NPDCCH on the PO, the network device does not send any signal (namely, the DTX). Correspondingly, the terminal device detects the WUS/DTX before the PO. If the WUS is detected, the terminal device blindly detects the NPDCCH starting from the PO location. If no WUS is detected, the terminal device does not blindly detect the NPDCCH starting from the PO location.

The NB-IoT system has three deployment modes: an in-band (IB) deployment mode, a guard-band (GB) deployment mode, and a standalone (SA) deployment mode. In the three deployment modes, a WUS sequence corresponding to the WUS is generated based on a ZC (Zadoff-Chu) sequence, a phase shift, and a resource element level (RE-level) scrambling sequence or cover code. A difference lies in that, in the IB deployment mode, the network device can transmit the WUS only on the last 11 orthogonal frequency division multiplexing (OFDM) symbols in each subframe, and a length of the ZC sequence is 131; however, in the GB deployment mode or the SA deployment mode, the network device can transmit the WUS on all OFDM symbols (namely, 14 OFDM symbols) in each subframe, and currently, a specific value of the length of the ZC sequence is not specified.

Because quantities of OFDM symbols occupied by WUSs are different in different deployment modes, WUSs sent by the network device in the GB deployment mode and the SA deployment mode are different from those sent in the IB deployment mode. Consequently, when receiving the WUSs, the terminal device needs to adjust a receiver based on different cases, or the terminal device needs to deploy different receivers to receive the WUSs in different deployment modes. As a result, implementation complexity and costs of the terminal device are increased. Therefore, how the network device sends the WUS to reduce the implementation complexity of the terminal device and further reduce the costs of the terminal device is an urgent problem to be resolved.

SUMMARY

An objective of implementations of this application is to provide a signal sending method, a signal receiving method, and an apparatus, to reduce complexity of receiving a WUS by a terminal device.

According to a first aspect, an embodiment of this application provides a signal sending method, applied to a GB deployment mode or an SA deployment mode.

In accordance with the first aspect, a network device generates a first sequence, where the first sequence is a WUS sequence in an in-band deployment mode; the network device maps the first sequence to the last 11 OFDM symbols in a first subframe, and maps, to the first M OFDM symbols in the first subframe sequentially, a sequence that belongs to the first sequence and that is to be mapped to a first OFDM symbol to an $M^{th}$ OFDM symbol, where the first OFDM symbol to the $M^{th}$ OFDM symbol are M OFDM symbols of the last N OFDM symbols in the first subframe, N is greater than or equal to M, N is an integer greater than 0 and less than 12, and M is an integer greater than 0 and less than 4; and the network device sends the first subframe.

In the foregoing method, the network device maps the first sequence to the last 11 OFDM symbols in the first subframe, so that in each of three different deployment modes, a WUS sequence in the last 11 OFDM symbols in a subframe carrying a WUS is the same, and a terminal device may receive the last 11 OFDM symbols through a same receiver, thereby reducing complexity of receiving the WUS by the terminal device and improving efficiency.

In an optional implementation, at least one of the first OFDM symbol to the $M^{th}$ OFDM symbol is an OFDM symbol that does not include a reference signal.

According to the foregoing method, a quantity of REs that are used to transmit the first sequence and that are in the first M OFDM symbols in the first subframe can be increased, thereby increasing a probability that the first sequence is successfully detected.

In an optional implementation, OFDM symbols in the first subframe are sequentially an OFDM symbol 0 to an OFDM symbol 13 in a time sequence; and the first OFDM symbol to the $M^{th}$ OFDM symbol are M OFDM symbols of the following OFDM symbols in the first subframe:
the OFDM symbol 3, the OFDM symbol 4, the OFDM symbol 7, the OFDM symbol 8, the OFDM symbol 9, the OFDM symbol 10, and the OFDM symbol 11.

According to the foregoing method, a quantity of REs that are used to transmit the first sequence and that are in the first M OFDM symbols in the first subframe can be increased, thereby increasing a probability that the first sequence is successfully detected.

In an optional implementation, a value of N is 11, and the first OFDM symbol to the $M^{th}$ OFDM symbol are the first M OFDM symbols of the last 11 OFDM symbols in the first subframe.

In an optional implementation, when an $i^{th}$ OFDM symbol in the first OFDM symbol to the $M^{th}$ OFDM symbol includes the reference signal, the method further includes:

The network device maps the reference signal on the $i^{th}$ OFDM symbol in the first OFDM symbol to the $M^{th}$ OFDM symbol to an $i^{th}$ OFDM symbol in the first M OFDM symbols.

According to the foregoing method, the reference signal can be sent by using the first M OFDM symbols, thereby improving a success rate of receiving the reference signal.

In an optional implementation, a value of M is 3, and the value of N is 11.

In an optional implementation, the first sequence is generated based on a ZC sequence, a phase shift, and a resource element RE-level scrambling sequence; or the first sequence is generated based on a ZC sequence and a resource element RE-level scrambling sequence, where a length of the ZC sequence is 131.

According to a second aspect, an embodiment of this application provides a signal receiving method, applied to a GB deployment mode or an SA deployment mode.

In accordance with the second aspect, a terminal device receives a first subframe from a network device, where a first sequence is mapped to the last 11 orthogonal frequency division multiplexing OFDM symbols in the first subframe, a sequence that belongs to the first sequence and that is to be mapped to a first OFDM symbol to an $M^{th}$ OFDM symbol is mapped to the first M OFDM symbols in the first subframe sequentially, the first OFDM symbol to the $M^{th}$ OFDM symbol are M OFDM symbols of the last N OFDM symbols in the first subframe, N is greater than or equal to M, N is an integer greater than 0 and less than 12, M is an integer greater than 0 and less than 4, and the first sequence is a wake-up signal WUS sequence in an in-band deployment mode; and the terminal device performs sequence detection in the first subframe.

In the foregoing method, in each of three different deployment modes, a WUS sequence in the last 11 OFDM symbols in a subframe carrying a WUS is the same, and the terminal device may receive the last 11 OFDM symbols through a same receiver, thereby reducing complexity of receiving the WUS by the terminal device and improving efficiency.

In an optional implementation, at least one of the first OFDM symbol to the $M^{th}$ OFDM symbol is an OFDM symbol that does not include a reference signal.

In an optional implementation, OFDM symbols in the first subframe are sequentially an OFDM symbol 0 to an OFDM symbol 13 in a time sequence; and
  the first OFDM symbol to the $M^{th}$ OFDM symbol are M OFDM symbols of the following OFDM symbols in the first subframe: the OFDM symbol 3, the OFDM symbol 4, the OFDM symbol 7, the OFDM symbol 8, the OFDM symbol 9, the OFDM symbol 10, and the OFDM symbol 11.

In an optional implementation, a value of N is 11, and the first OFDM symbol to the $M^{th}$ OFDM symbol are the first M OFDM symbols of the last 11 OFDM symbols in the first subframe.

In an optional implementation, when an $i^{th}$ OFDM symbol in the first OFDM symbol to the $M^{th}$ OFDM symbol includes the reference signal, the method further includes:

The network device maps the reference signal on the $i^{th}$ OFDM symbol in the first OFDM symbol to the $M^{th}$ OFDM symbol to an $i^{th}$ OFDM symbol in the first M OFDM symbols.

In an optional implementation, a value of M is 3, and the value of N is 11.

In an optional implementation, the first sequence is generated based on a ZC sequence, a phase shift, and a resource element RE-level scrambling sequence; or
  the first sequence is generated based on a ZC sequence and a resource element RE-level scrambling sequence, where a length of the ZC sequence is 131.

In an optional implementation, that the terminal device performs the sequence detection in the first subframe is described as follows.

The terminal device performs the sequence detection on the last 11 OFDM symbols in the first subframe; or
  the terminal device performs the sequence detection on all OFDM symbols in the first subframe.

According to a third aspect, an embodiment of this application provides a signal sending method, applied to a guard-band GB deployment mode or a standalone SA deployment mode.

In accordance with the third aspect, a network device generates a second sequence, where the second sequence includes a first sequence and a third sequence, the first sequence is a wake-up signal WUS sequence in an in-band deployment mode, and the third sequence is a sequence other than the first sequence in the second sequence; the network device maps the first sequence in the second sequence to the last 11 orthogonal frequency division multiplexing OFDM symbols in a first subframe, and maps the third sequence to the first M OFDM symbols in the first subframe, where M is an integer greater than 0 and less than 4; and the network device sends the first subframe.

In the foregoing method, the network device maps the first sequence to the last 11 OFDM symbols in the first subframe, so that in each of three different deployment modes, a WUS sequence in the last 11 OFDM symbols in a subframe carrying a WUS is the same, and a terminal device may receive the last 11 OFDM symbols through a same receiver, thereby reducing complexity of receiving the WUS by the terminal device and improving efficiency.

In an optional implementation, the first sequence is generated based on a ZC sequence, a phase shift, and a resource element RE-level scrambling sequence; or
  the first sequence is generated based on a ZC sequence and a resource element RE-level scrambling sequence, where a length of the ZC sequence is 131.

In an optional implementation, a length of the first sequence is 132; and
  the second sequence is a sequence whose length is 168 and that is obtained after cyclic shift extension is performed on the first sequence.

In an optional implementation, the first sequence is a sequence whose length is 132 and that starts from a starting point in the second sequence.

According to a fourth aspect, an embodiment of this application provides a signal receiving method, applied to a GB deployment mode or an SA deployment mode.

In accordance with the fourth aspect, a terminal device receives a first subframe from a network device, where a first sequence in a second sequence is mapped to the last 11 orthogonal frequency division multiplexing OFDM symbols in the first subframe, a third sequence in the second sequence is mapped to the first M OFDM symbols in the first subframe, the first sequence is a wake-up signal WUS sequence in an in-band deployment mode, the third sequence is a sequence other than the first sequence in the second sequence, and M is an integer greater than 0 and less than 4; and the terminal device performs sequence detection in the first subframe.

In the foregoing method, in each of three different deployment modes, a WUS sequence in the last 11 OFDM symbols in a subframe carrying a WUS is the same, and the terminal device may receive the last 11 OFDM symbols through a same receiver, thereby reducing complexity of receiving the WUS by the terminal device and improving efficiency.

In an optional implementation, the first sequence is generated based on a ZC sequence, a phase shift, and a resource element RE-level scrambling sequence; or the first sequence is generated based on a ZC sequence and a resource element RE-level scrambling sequence, where a length of the ZC sequence is 131.

In an optional implementation, a length of the first sequence is 132; and the second sequence is a sequence whose length is 168 and that is obtained after cyclic shift extension is performed on the first sequence.

In an optional implementation, the first sequence is a sequence whose length is 132 and that starts from a starting point in the second sequence.

In an optional implementation, that the terminal device performs the sequence detection in the first subframe is described as follows.

The terminal device performs the sequence detection on the last 11 OFDM symbols in the first subframe; or the terminal device performs the sequence detection on all OFDM symbols in the first subframe.

According to a fifth aspect, an embodiment of this application provides a network device. The network device includes a memory, a radio frequency circuit module, and a processor. The memory is configured to store an instruction. The processor is configured to: execute the instruction stored in the memory, and control the radio frequency circuit module to send a signal and receive a signal. When the processor executes the instruction stored in the memory, the network device is configured to perform the method according to any one of the first aspect or the possible designs of the first aspect, or perform the method according to any one of the third aspect or the possible designs of the third aspect.

According to a sixth aspect, an embodiment of this application provides a network device, configured to implement the method according to any one of the first aspect or the possible designs of the first aspect, or perform the method according to any one of the third aspect or the possible designs of the third aspect, and including corresponding functional modules, for example, a processing unit or a transceiver unit, that are separately configured to implement the steps in the foregoing method.

According to a seventh aspect, an embodiment of this application provides a terminal device. The terminal device includes a memory, a transceiver, and a processor. The memory is configured to store an instruction. The processor is configured to: execute the instruction stored in the memory, and control the transceiver to send and receive a signal. When the processor executes the instruction stored in the memory, the terminal device is configured to perform the method according to any one of the second aspect or the possible designs of the second aspect, or perform the method according to any one of the fourth aspect or the possible designs of the fourth aspect.

According to an eighth aspect, an embodiment of this application provides a terminal device, configured to implement the method according to any one of the second aspect or the possible designs of the second aspect, or perform the method according to any one of the fourth aspect or the possible designs of the fourth aspect, and including corresponding functional modules, for example, a processing unit or a transceiver unit, that are separately configured to implement the steps in the foregoing method.

According to a ninth aspect, an embodiment of this application provides a computer-readable storage medium. The computer-readable storage medium stores a computer-readable instruction. When a computer reads and executes the computer-readable instruction, the computer is enabled to perform the method according to any one of any aspect or the possible designs of any aspect.

According to a tenth aspect, an embodiment of this application provides a computer program product. When a computer reads and executes the computer program product, the computer is enabled to perform the method according to any one of any aspect or the possible designs of any aspect.

According to an eleventh aspect, an embodiment of this application provides a chip. The chip is connected to a memory, and is configured to read and execute a software program stored in the memory, to implement the method according to any one of any aspect or the possible designs of any aspect.

DESCRIPTION OF EMBODIMENTS

The following further describes in detail the embodiments of this application with reference to the accompanying drawings.

The embodiments of this application may be applied to various mobile communications systems, for example, a new radio (NR) system, a global system for mobile communications (GSM) system, a code division multiple access (CDMA) system, a wideband code division multiple access (WCDMA) system, a general packet radio service (GPRS) system, a long term evolution (LTE) system, a long term evolution-advanced (LTE-A) system, a universal mobile telecommunications system (UMTS), an evolved long term evolution (eLTE) system, a future communications system, and another communications system. Specifically, this is not limited herein.

Figure 1:
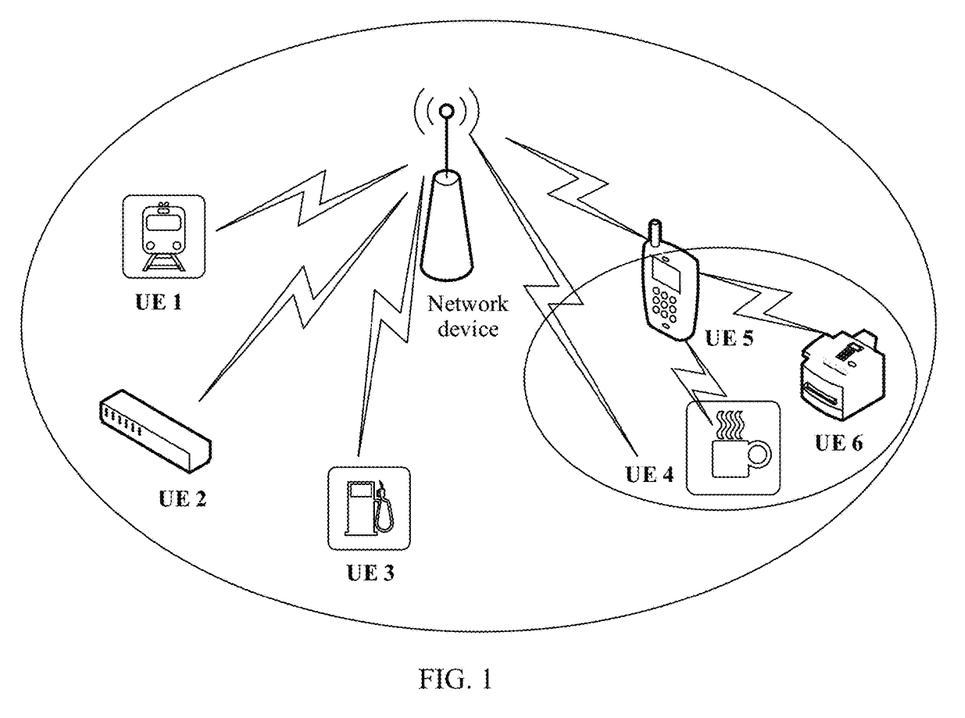
FIG. 1 is a schematic diagram of a communications system to which an embodiment of this application is applicable.

For ease of understanding the embodiments of this application, a communications system shown in FIG. 1 is first used as an example to describe in detail a communications system to which the embodiments of this application are applicable. FIG. 1 is a schematic diagram of a communications system to which a communication method according to an embodiment of this application is applicable. As shown in FIG. 1, a network device and UE 1 to UE 6 are included in a communications system. In the communications system, the UE 1 to the UE 6 may send uplink data to the network device, and the network device may send downlink data to the UE 1 to the UE 6. In addition, the UE 4 to the UE 6 may also be included in a communications system. In this case, in the communications system, the network device may send downlink data of the UE 4 and the UE 6 to the UE 5, and then the UE 5 forwards the downlink data to the UE 4 and the UE 6.

Specifically, a terminal device in the embodiments of this application is a device that provides a voice and/or data connectivity for a user and that has a wireless transceiver function, or a chip that can be disposed in the device. The terminal device may communicate with one or more core networks through a radio access network (RAN). The terminal device may be a mobile phone, a tablet (e.g., iPad, etc.), a computer having a wireless transceiver function, a personal digital assistant (PDA), a virtual reality (VR) terminal, an augmented reality (AR) terminal, a wireless terminal in industrial control, a wireless terminal in self driving, a wireless terminal in telemedicine (e.g., remote medicine), a wireless terminal in a smart grid, a wireless terminal in transportation safety, a wireless terminal in a smart city, a wireless terminal in a smart home, or the like. An application scenario is not limited in the embodiments of this application. In this application, the terminal device and a chip that can be disposed in the terminal device are collectively referred to as a terminal device. The terminal device in the embodiments of this application may also be referred to as user equipment (UE), a user terminal, an access terminal, a subscriber unit, a subscriber station, a mobile station, a remote station, a remote terminal, a mobile device, a terminal, a wireless communications device, a user agent, or a user apparatus.

The network device is a device having a wireless transceiver function or a chip that can be disposed in the device. The network device may be configured to perform mutual conversion between a received over-the-air frame and an IP packet, and serve as a router between the terminal device and a remaining portion of the access network. The network device may be further configured to coordinate attribute management on an air interface. The device includes but is not limited to: a satellite, a gateway station, an evolved NodeB (eNB), a radio network controller (RNC), a NodeB (NB), a base station controller (BSC), a base transceiver station (BTS), a home base station (e.g., a home evolved NodeB, or a home NodeB, HNB), a baseband unit (BBU), an access point (AP) in a wireless fidelity (Wi-Fi) system, a wireless relay node, a wireless backhaul node, a transmission point (transmission and reception point, TRP, or transmission point, TP), or the like; or may be a gNB or a transmission point (TRP or TP) in a 5G system, such as an NR system, or one antenna panel or a group of antenna panels (including a plurality of antenna panels) of a base station in a 5G system; or may be a network node, such as a baseband unit (BBU), or a distributed unit (DU) in a DU-CU architecture, that constitutes the gNB or the transmission point.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

In the embodiments of this application, an NB-IoT network scenario in a wireless communications network is used as an example to describe some scenarios. It should be noted that the solutions in the embodiments of this application may be further applied to another wireless communications network, and a corresponding name may also be replaced with a name of a corresponding function in the another wireless communications network.

Figure 2:
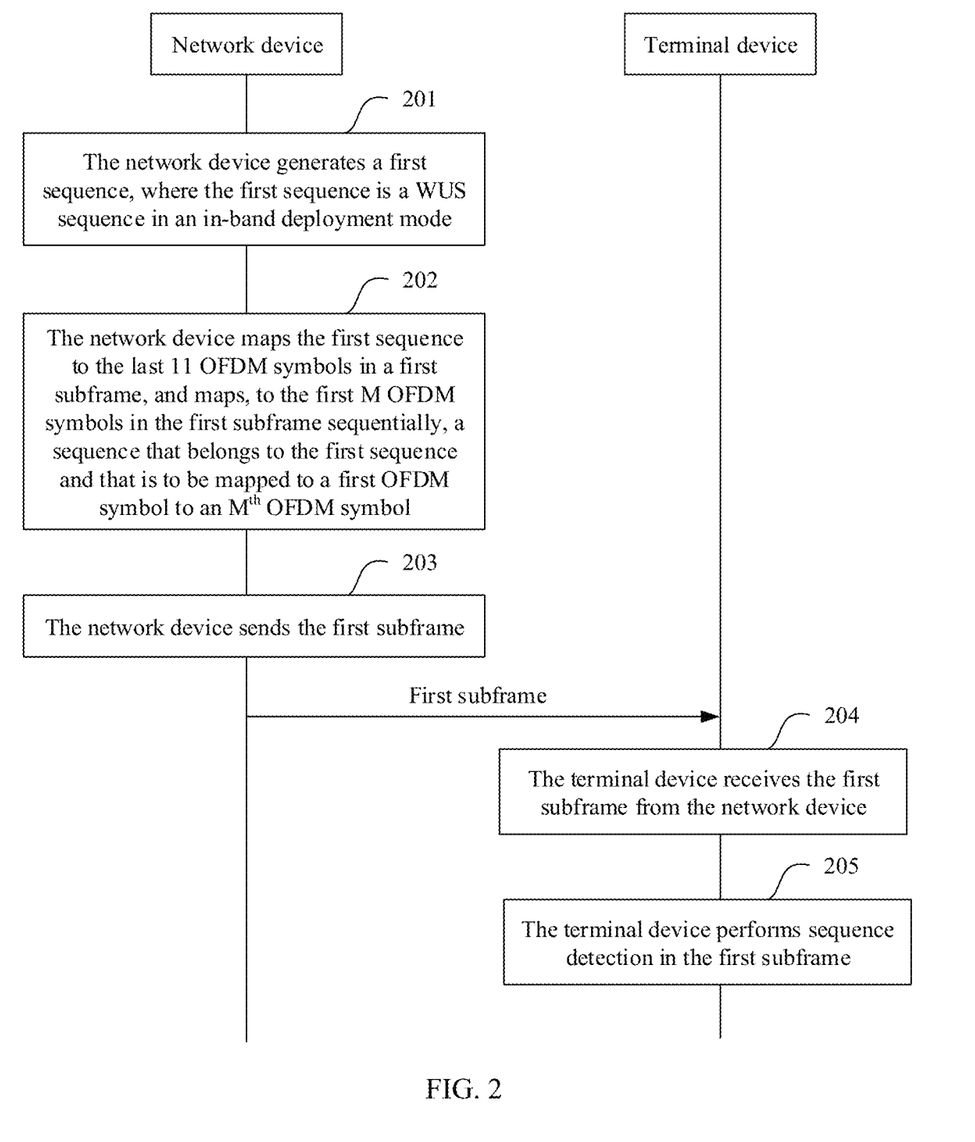
FIG. 2 is a schematic flowchart of a signal sending and receiving method according to an embodiment of this application.

With reference to the foregoing descriptions, FIG. 2 is a schematic flowchart of a signal sending and receiving method according to an embodiment of this application.

Referring to FIG. 2, the method may be applied to a GB deployment mode or an SA deployment mode, and includes the following steps.

Step 201: A network device generates a first sequence, where the first sequence is a WUS sequence in an in-band deployment mode.

In this embodiment of this application, a sequence that is of a WUS and that is obtained after being mapped to an OFDM symbol is referred to as the WUS sequence.

Step 202: The network device maps the first sequence to the last 11 OFDM symbols in a first subframe, wherein the network device maps, to the first M OFDM symbols in the first subframe sequentially, a sequence that belongs to the first sequence and that is to be mapped to a first OFDM symbol to an $M^{th}$ OFDM symbol.

The first OFDM symbol to the $M^{th}$ OFDM symbol are M OFDM symbols of the last N OFDM symbols in the first subframe, N is greater than or equal to M, N is an integer greater than 0 and less than 12, and M is an integer greater than 0 and less than 4.

Specific values of N and M may be determined based on an actual situation. For example, the value of N is 11, and the value of M is 3.

Step 203: The network device sends the first subframe.

Step 204: The terminal device receives the first subframe from the network device.

The first sequence is mapped to the last 11 OFDM symbols in the first subframe, the sequence that belongs to the first sequence and that is to be mapped to the first OFDM symbol to the $M^{th}$ OFDM symbol are mapped to the first M OFDM symbols in the first subframe sequentially, the first OFDM symbol to the $M^{th}$ OFDM symbol are the M OFDM symbols of the last N OFDM symbols in the first subframe, N is greater than or equal to M, N is an integer greater than 0 and less than 12, M is an integer greater than 0 and less than 4, and the first sequence is the wake-up signal WUS sequence in the in-band deployment mode.

Step 205: The terminal device performs sequence detection in the first subframe.

In step 201, in the SA deployment mode, NB-IoT service data is transmitted by using an independent carrier, namely, a carrier in a GSM network, and a bandwidth of the independent carrier may be 180 kHz.

In the GB deployment mode, NB-IoT service data is transmitted by using a guard band of a carrier in an LTE system, and a bandwidth that is located in the guard band is 180 kHz.

In the in-band deployment mode, NB-IoT service data is transmitted by using one or more resource blocks in a carrier in an LTE system, and a bandwidth of one of the resource blocks is 180 kHz.

The network device may determine, based on features of the foregoing three modes, a mode of a carrier carrying the first subframe.

In this embodiment of this application, the WUS sequence in the in-band deployment mode, namely, the first sequence, may be generated based on a ZC sequence, a phase shift, and an RE-level scrambling sequence. The scrambling sequence may also be referred to as a cover code, and is referred to as a scrambling sequence in the following.

Specifically, the first sequence w(n) may satisfy the following formula:

$$w(n)=c(m)\cdot e^{-j2\pi\theta n}\cdot e^{-j\pi un'(n'+1)/l_z}, \quad \text{(Eq. 1)}$$

where c(m) is an RE-level scrambling sequence or an RE-level cover code, $e^{-j2\pi\theta n}$ is a phase shift, $e^{-j\pi un'(n'+1)/l_z}$ is a ZC sequence whose root index is u and whose length is $l_z$, n'=n mod $l_z$, m=n mod $l_c$, $l_c$ is a length of c(m), and mod is a modulo operation.

Alternatively, the first sequence may be generated based on the ZC sequence and the resource element RE-level scrambling sequence. Specifically, the first sequence w(n) may satisfy the following formula:

$$w(n)=c(m)\cdot e^{-j\pi un'(n'+1)/l_z} \quad \text{(Eq. 2)}$$

For parameters in the formula (2), refer to explanations in the formula (1). Details are not described herein again.

In the formula (1) and the formula (2), the length of the ZC sequence may be 131, and the length of the RE-level scrambling sequence or the RE-level cover code may be 132. Correspondingly, a length of the first sequence may be 132.

In step 202, a specific implementation in which the network device maps the first sequence to the last 11 OFDM symbols in the first subframe may be the same as that in the in-band deployment mode. Details are not described herein again.

When the network device performs mapping on the first M OFDM symbols in the first subframe, for an $i^{th}$ OFDM symbol in the first OFDM symbol to the $M^{th}$ OFDM symbol, the network device may map a sequence that belongs to the first sequence and that is to be mapped to the $i^{th}$ OFDM symbol to an $i^{th}$ OFDM symbol in the first M OFDM symbols in the first subframe. A value of i is 1, 2, . . . , or M.

Figure 3:
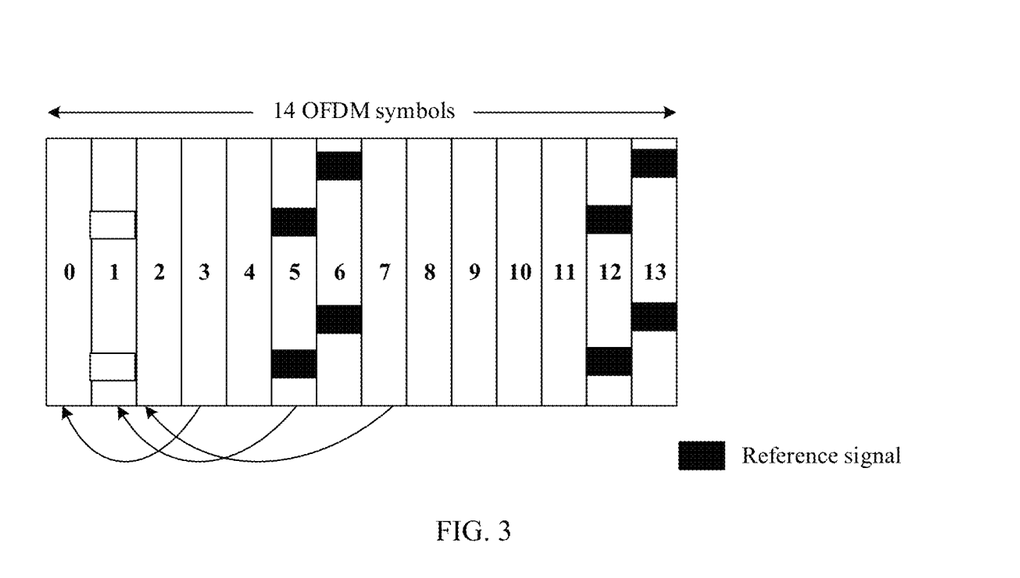
FIG. 3 is a schematic diagram of mapping a first sequence to OFDM symbols in a first subframe according to an embodiment of this application.

For example, when M is 3, a specific mapping process may be shown in FIG. 3. OFDM symbols in the first subframe are sequentially an OFDM symbol 0 to an OFDM symbol 13 in a time sequence. The first OFDM symbol is the OFDM symbol 3, a second OFDM symbol is the OFDM symbol 5, and a third OFDM symbol is the OFDM symbol 7. The network device maps a sequence that belongs to the first sequence and that is to be mapped to the first OFDM symbol (namely, the OFDM symbol 3) to the $1^{st}$ OFDM symbol (namely, the OFDM symbol 0) in the first subframe; maps a sequence that belongs to the first sequence and that is to be mapped to the second OFDM symbol (namely, the OFDM symbol 5) to the $2^{nd}$ OFDM symbol (namely, the OFDM symbol 1) in the first subframe; and maps a sequence that belongs to the first sequence and that is to be mapped to the third OFDM symbol (namely, the OFDM symbol 7) to the $3^{rd}$ OFDM symbol (namely, the OFDM symbol 2) in the first subframe.

Figure 4:
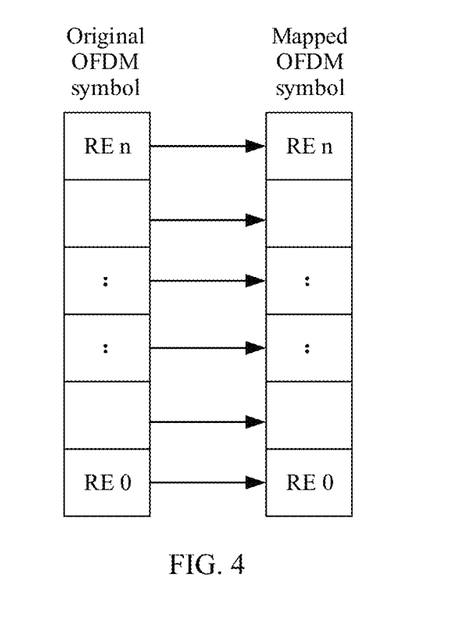
FIG. 4 is a schematic diagram of mapping of OFDM symbols according to an embodiment of this application.

It should be noted that, in the foregoing mapping process, a location of an RE in which the sequence that belongs to the first sequence is located in the mapped OFDM symbol is the same as a location of an RE in which the sequence is located in an original OFDM symbol. For details, refer to FIG. 4. In FIG. 4, a sequence in an RE 0 to an RE n in an original OFDM symbol is mapped to an OFDM symbol to be mapped to sequentially.

In this embodiment of this application, there is a reference signal in the last 11 OFDM symbols in the first subframe, and channel estimation and channel equalization do not need to be performed on the WUS signal. Therefore, at least one OFDM symbol of the first OFDM symbol to the $M^{th}$ OFDM symbol may be an OFDM symbol that does not include the reference signal.

According to the foregoing method, a quantity of REs that are used to transmit the first sequence and that are in the first M OFDM symbols in the first subframe can be increased, thereby increasing a probability that the first sequence is successfully detected.

Further, the first OFDM symbol to the $M^{th}$ OFDM symbol are OFDM symbols that do not include the reference signal. The OFDM symbols in the first subframe are sequentially the OFDM symbol 0 to the OFDM symbol 13 in the time sequence, and the following OFDM symbols do not include the reference signal:

the OFDM symbol 3, the OFDM symbol 4, the OFDM symbol 7, the OFDM symbol 8, the OFDM symbol 9, the OFDM symbol 10, and the OFDM symbol 11.

Therefore, the first OFDM symbol to the $M^{t}h$ OFDM symbol may be M OFDM symbols of the following OFDM symbols in the first subframe:

the OFDM symbol 3, the OFDM symbol 4, the OFDM symbol 7, the OFDM symbol 8, the OFDM symbol 9, the OFDM symbol 10, and the OFDM symbol 11.

In this embodiment of this application, if the at least one of the first OFDM symbol to the $M^{th}$ OFDM symbol includes the reference signal, when the network device performs mapping on the first M OFDM symbols in the first subframe, the network device may map only the sequence that belongs to the first sequence, and may not map the reference signal to the first M OFDM symbols in the first subframe. In this case, if the first OFDM symbol to the $M^{th}$ OFDM symbol include the reference signal, neither the sequence that belongs to the first sequence nor the reference signal is mapped to a location of an RE that is in the first M OFDM symbols in the first subframe and that corresponds to the reference signal.

Further, if the first OFDM symbol to the $M^{th}$ OFDM symbol include the reference signal, the network device may map the reference signal to the first M OFDM symbols in the first subframe. Specifically, the network device maps the reference signal on the $i^{th}$ OFDM symbol in the first OFDM symbol to the $M^{th}$ OFDM symbol to the $i^{th}$ OFDM symbol in the first M OFDM symbols. It should be noted that a location of an RE in which the reference signal mapped to the first M OFDM symbols in the first subframe is located is the same as a location of an RE in which the reference signal on the original OFDM symbol is located.

Optionally, the first OFDM symbol to the $M^{th}$ OFDM symbol may alternatively be the first M OFDM symbols of the last 11 OFDM symbols in the first subframe.

In step 205, the terminal device may perform the sequence detection on all OFDM symbols in the first subframe, to detect the first sequence in the first subframe. Alternatively, the terminal device may perform the sequence detection only in the last 11 OFDM symbols in the first subframe, to detect the first sequence in the first subframe.

When detecting the first sequence, the terminal device may detect all of the sequence of the first sequence, or may detect only a portion of the sequence of the first sequence. This is specifically determined based on an actual situation, and details are not described herein.

In this embodiment of this application, the network device may further generate a second sequence including the first sequence, and map the first sequence to the last 11 OFDM symbols in the first subframe, so that the terminal device can receive WUS sequences in different deployment modes through one receiver.

Figure 5:
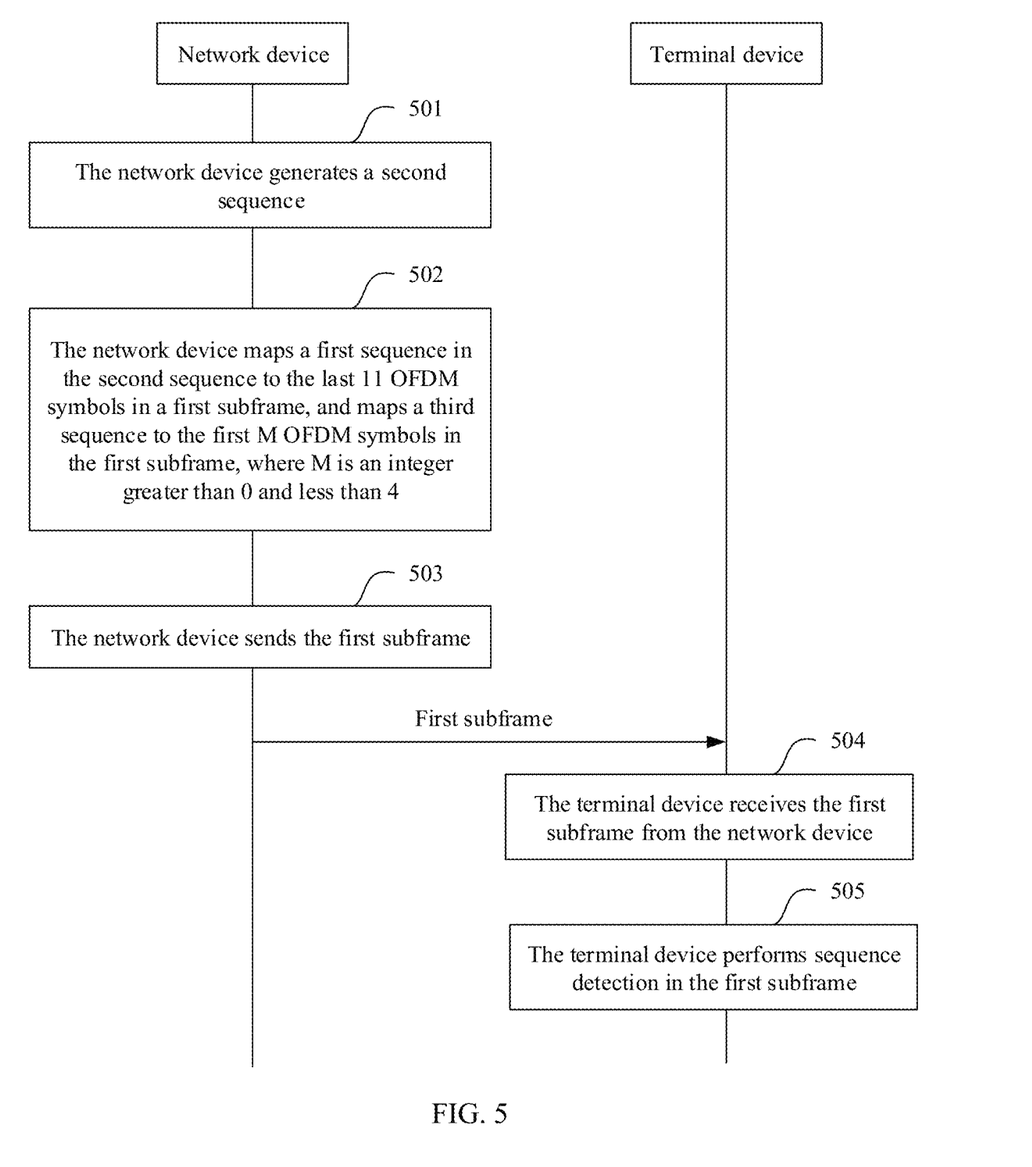
FIG. 5 is a schematic flowchart of a signal sending and receiving method according to an embodiment of this application.

FIG. 5 is a schematic flowchart of a signal sending and receiving method according to an embodiment of this application.

Referring to FIG. 5, the method may be applied to a GB deployment mode or an SA deployment mode, and includes the following steps.

Step 501: A network device generates a second sequence, where the second sequence includes a first sequence and a third sequence, the first sequence is a WUS sequence in an in-band deployment mode, and the third sequence is a sequence other than the first sequence in the second sequence.

In step 501, a length of the second sequence may be 168, and the first sequence may be a sequence whose length is 132 and that starts from a starting point in the second sequence.

In this embodiment of this application, in a first possible case, the first sequence may be a sequence that satisfies a formula (1) or a formula (2). In this case, the second sequence may be a sequence whose length is 168 and that is obtained after cyclic shift extension is performed on the first sequence.

In a second possible case, the network device obtains a ZC sequence that is used to generate the WUS sequence in the IB deployment mode, cyclically shifts the ZC sequence to a ZC sequence whose length is 168, and then substitutes the ZC sequence into the formula (1) or the formula (2) to generate the second sequence, where a length of each of an RE-level scrambling sequence and a phase shift in the formula (1) or the formula (2) is 168.

In either case, a sequence whose length is the first 132 bits obtained from the second sequence is the first sequence.

For other content in step 501, refer to descriptions in step 201. Details are not described herein again.

Step 502: The network device maps the first sequence in the second sequence to the last 11 OFDM symbols in a first subframe, and maps the third sequence to the first M OFDM symbols in the first subframe, where M is an integer greater than 0 and less than 4.

Figure 6:
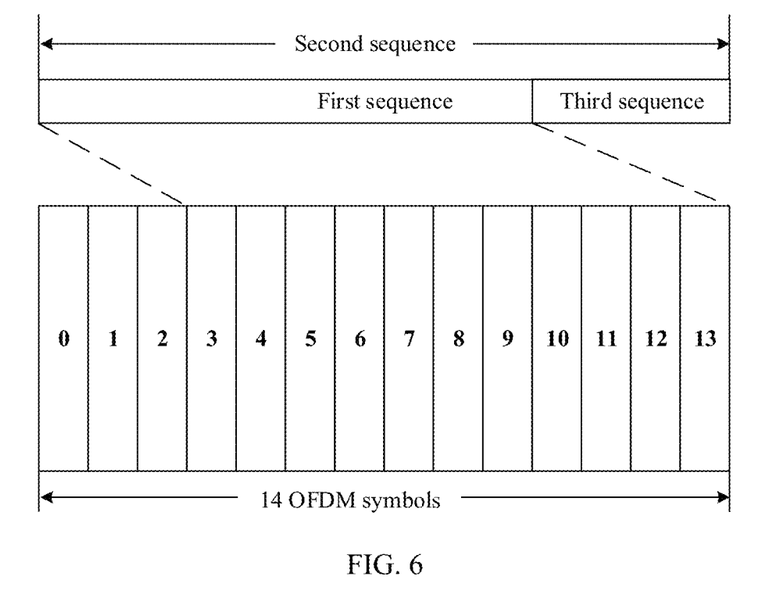
FIG. 6 is a schematic diagram of mapping a first sequence to OFDM symbols in a first subframe according to an embodiment of this application.

In step 502, OFDM symbols in the first subframe are sequentially an OFDM symbol 0 to an OFDM symbol 13 in a time sequence, and a process in which the network device maps the second sequence to the first subframe may be shown in FIG. 6. In FIG. 6, M is 3. The network device maps the first sequence in the second sequence to the OFDM symbol 3 to the OFDM symbol 13 in the first subframe, and maps the third sequence to the OFDM symbol 0 to the OFDM symbol 2 in the first subframe.

Step 503: The network device sends the first subframe.

Step 504: A terminal device receives the first subframe from the network device.

The first sequence in the second sequence is mapped to the last 11 OFDM symbols in the first subframe, the third sequence in the second sequence is mapped to the first M OFDM symbols in the first subframe, the first sequence is the WUS sequence in the in-band deployment mode, the third sequence is the sequence other than the first sequence in the second sequence, and M is an integer greater than 0 and less than 4.

Step 505: The terminal device performs sequence detection in the first subframe.

For other content in step 503 to step 505, refer to descriptions in step 203 to step 205. Details are not described herein again.

Figure 7:
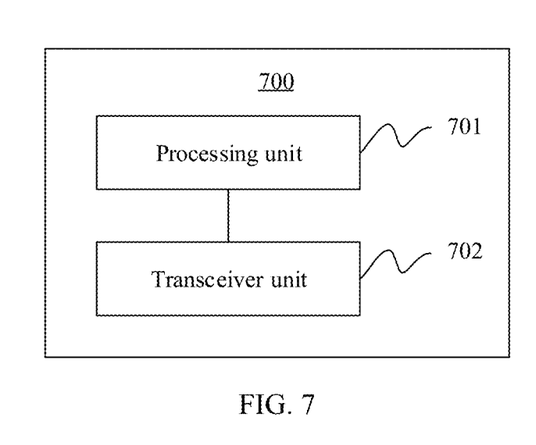
FIG. 7 is a schematic structural diagram of a communications apparatus according to an embodiment of this application.

FIG. 7 is a schematic structural diagram of a communications apparatus according to an embodiment of this application. The communications apparatus may be configured to perform actions of the network device in the foregoing method embodiments. The communications apparatus 700 includes a processing unit 701 and a transceiver unit 702.

The communications apparatus 700 may be applied to a guard-band GB deployment mode or a standalone SA deployment mode.

When the communications apparatus 700 performs actions of the network device in the process shown in FIG. 2, the processing unit 701 is configured to: generate a first sequence, where the first sequence is a wake-up signal WUS sequence in an in-band deployment mode; and map the first sequence to the last 11 orthogonal frequency division multiplexing OFDM symbols in a first subframe, and map, to the first M OFDM symbols in the first subframe sequentially, a sequence that belongs to the first sequence and that is to be mapped to a first OFDM symbol to an $M^{th}$ OFDM symbol, where the first OFDM symbol to the $M^{th}$ OFDM symbol are M OFDM symbols of the last N OFDM symbols in the first subframe, N is greater than or equal to M, N is an integer greater than 0 and less than 12, and M is an integer greater than 0 and less than 4; and the transceiver unit 702 is configured to send the first subframe.

In an optional implementation, at least one of the first OFDM symbol to the $M^{th}$ OFDM symbol is an OFDM symbol that does not include a reference signal.

In an optional implementation, OFDM symbols in the first subframe are sequentially an OFDM symbol 0 to an OFDM symbol 13 in a time sequence; and the first OFDM symbol to the $M^{th}$ OFDM symbol are M OFDM symbols of the following OFDM symbols in the first subframe:

the OFDM symbol 3, the OFDM symbol 4, the OFDM symbol 7, the OFDM symbol 8, the OFDM symbol 9, the OFDM symbol 10, and the OFDM symbol 11.

In an optional implementation, a value of N is 11, and the first OFDM symbol to the $M^{th}$ OFDM symbol are the first M OFDM symbols of the last 11 OFDM symbols in the first subframe.

In an optional implementation, when an $i^{th}$ OFDM symbol in the first OFDM symbol to the $M^{th}$ OFDM symbol includes the reference signal, the processing unit 701 is further configured to:

map the reference signal on the $i^{th}$ OFDM symbol in the first OFDM symbol to the $M^{th}$ OFDM symbol to an $i^{th}$ OFDM symbol in the first M OFDM symbols.

In an optional implementation, a value of M is 3, and the value of N is 11.

In an optional implementation, the first sequence is generated based on a ZC sequence, a phase shift, and a resource element RE-level scrambling sequence; or the first sequence is generated based on a ZC sequence and a resource element RE-level scrambling sequence, where a length of the ZC sequence is 131.

When the communications apparatus 700 performs actions of the network device in the process shown in FIG. 5, the processing unit 701 is configured to: generate a second sequence, where the second sequence includes a first sequence and a third sequence, the first sequence is a wake-up signal WUS sequence in an in-band deployment mode, and the third sequence is a sequence other than the first sequence in the second sequence; and map the first sequence in the second sequence to the last 11 orthogonal frequency division multiplexing OFDM symbols in a first subframe, and map the third sequence to the first M OFDM symbols in the first subframe, where M is an integer greater than 0 and less than 4; and the transceiver unit 702 is configured to send the first subframe.

In an optional implementation, the first sequence is generated based on a ZC sequence, a phase shift, and a resource element RE-level scrambling sequence; or the first sequence is generated based on a ZC sequence and a resource element RE-level scrambling sequence, where a length of the ZC sequence is 131.

In an optional implementation, a length of the first sequence is 132; and the second sequence is a sequence whose length is 168 and that is obtained after cyclic shift extension is performed on the first sequence.

In an optional implementation, the first sequence is a sequence whose length is 132 and that starts from a starting point in the second sequence.

Figure 8:
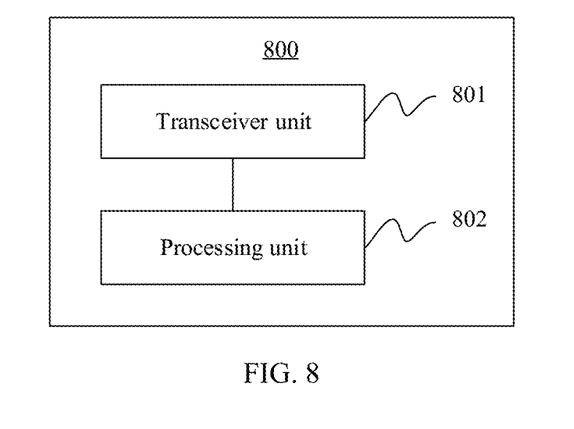
FIG. 8 is a schematic structural diagram of a communications apparatus according to an embodiment of this application.

FIG. 8 is a schematic structural diagram of a communications apparatus according to an embodiment of this application. The communications apparatus may be configured to perform actions of the terminal device in the foregoing method embodiments, and the communications apparatus may be applied to a GB deployment mode or an SA deployment mode.

The communications apparatus 800 includes a transceiver unit 801 and a processing unit 802.

When the communications apparatus 800 performs actions of the terminal device in the process shown in FIG. 2, the transceiver unit 801 is configured to receive a first subframe from a network device, where a first sequence is mapped to the last 11 orthogonal frequency division multiplexing OFDM symbols in the first subframe, a sequence that belongs to the first sequence and that is to be mapped to a first OFDM symbol to an $M^{th}$ OFDM symbol is mapped to the first M OFDM symbols in the first subframe sequentially, the first OFDM symbol to the $M^{th}$ OFDM symbol are M OFDM symbols of the last N OFDM symbols in the first subframe, N is greater than or equal to M, N is an integer greater than 0 and less than 12, M is an integer greater than 0 and less than 4, and the first sequence is a wake-up signal WUS sequence in an in-band deployment mode; and the processing unit 802 is configured to perform sequence detection in the first subframe.

In an optional implementation, at least one of the first OFDM symbol to the $M^{th}$ OFDM symbol is an OFDM symbol that does not include a reference signal.

In an optional implementation, OFDM symbols in the first subframe are sequentially an OFDM symbol 0 to an OFDM symbol 13 in a time sequence; and the first OFDM symbol to the $M^{th}$ OFDM symbol are M OFDM symbols of the following OFDM symbols in the first subframe:

the OFDM symbol 3, the OFDM symbol 4, the OFDM symbol 7, the OFDM symbol 8, the OFDM symbol 9, the OFDM symbol 10, and the OFDM symbol 11.

In an optional implementation, a value of N is 11, and the first OFDM symbol to the $M^{th}$ OFDM symbol are the first M OFDM symbols of the last 11 OFDM symbols in the first subframe.

In an optional implementation, a value of M is 3, and the value of N is 11.

In an optional implementation, the first sequence is generated based on a ZC sequence, a phase shift, and a resource element RE-level scrambling sequence; or the first sequence is generated based on a ZC sequence and a resource element RE-level scrambling sequence, where a length of the ZC sequence is 131.

In an optional implementation, the processing unit 802 is specifically configured to:

perform the sequence detection on the last 11 OFDM symbols in the first subframe; or perform the sequence detection on all OFDM symbols in the first subframe.

When the communications apparatus 800 performs actions of the terminal device in the process shown in FIG. 5, the transceiver unit 801 is configured to receive a first subframe from a network device, where a first sequence in a second sequence is mapped to the last 11 orthogonal frequency division multiplexing OFDM symbols in the first subframe, a third sequence in the second sequence is mapped to the first M OFDM symbols in the first subframe, the first sequence is a wake-up signal WUS sequence in an in-band deployment mode, the third sequence is a sequence other than the first sequence in the second sequence, and M is an integer greater than 0 and less than 4; and the processing unit 802 is configured to perform sequence detection in the first subframe.

In an optional implementation, the first sequence is generated based on a ZC sequence, a phase shift, and a resource element RE-level scrambling sequence; or the first sequence is generated based on a ZC sequence and a resource element RE-level scrambling sequence, where a length of the ZC sequence is 131.

In an optional implementation, a length of the first sequence is 132; and the second sequence is a sequence whose length is 168 and that is obtained after cyclic shift extension is performed on the first sequence.

In an optional implementation, the first sequence is a sequence whose length is 132 and that starts from a starting point in the second sequence.

In an optional implementation, the processing unit 802 is specifically configured to:

perform the sequence detection on the last 11 OFDM symbols in the first subframe; or perform the sequence detection on all OFDM symbols in the first subframe.

Figure 9:
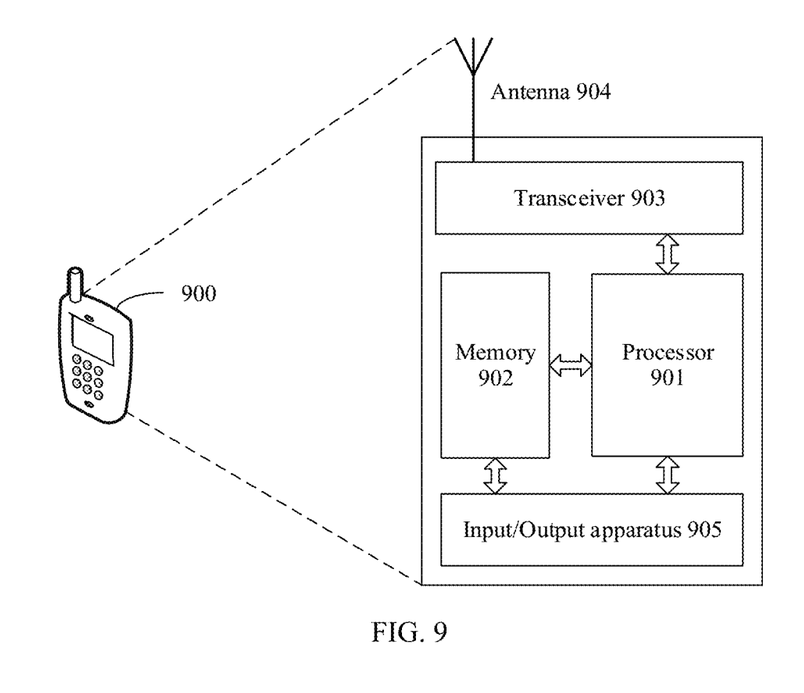
FIG. 9 is a schematic structural diagram of a terminal device according to an embodiment of this application.

FIG. 9 is a schematic structural diagram of a terminal device according to an embodiment of this application. The terminal device shown in FIG. 9 may be an implementation of a hardware circuit of the communications apparatus shown in FIG. 8. The terminal device is applicable to the flowchart shown in FIG. 2 or FIG. 5, and performs functions of the terminal device in the foregoing method embodiments. For ease of description, FIG. 9 shows only main components of the terminal device. As shown in FIG. 9, the terminal device 900 includes a processor 901, a memory 902, a transceiver 903, an antenna 904, and an input/output apparatus 905. The processor 901 is mainly configured to: process a communication protocol and communication data, control the entire wireless communications apparatus, execute a software program, and process data of the software program. For example, the processor 901 is configured to support the wireless communications apparatus in performing the actions described in the foregoing method embodiments. The memory 902 is mainly configured to store the software program and the data. The transceiver 903 is mainly configured to: perform conversion between a baseband signal and a radio frequency signal, and process the radio frequency signal. The antenna 904 is mainly configured to send and receive a radio frequency signal in a form of an electromagnetic wave. The input/output apparatus 905, such as a touchscreen, a display screen, or a keyboard, is mainly configured to receive data entered by a user and output data to the user.

When the terminal device 900 performs actions of the terminal device in the process shown in FIG. 2, the transceiver 903 is configured to receive a first subframe from a network device, where a first sequence is mapped to the last 11 orthogonal frequency division multiplexing OFDM symbols in the first subframe, a sequence that belongs to the first sequence and that is to be mapped to a first OFDM symbol to an $M^{th}$ OFDM symbol is mapped to the first M OFDM symbols in the first subframe sequentially, the first OFDM symbol to the $M^{th}$ OFDM symbol are M OFDM symbols of the last N OFDM symbols in the first subframe, N is greater than or equal to M, N is an integer greater than 0 and less than 12, M is an integer greater than 0 and less than 4, and the first sequence is a wake-up signal WUS sequence in an in-band deployment mode; and the processor 901 is configured to perform sequence detection in the first subframe.

For other steps performed by the terminal device 900, refer to descriptions in step 201 to step 205. Details are not described herein again.

When the terminal device 900 performs actions of the terminal device in the process shown in FIG. 5, the transceiver 903 is configured to receive a first subframe from a network device, where a first sequence in a second sequence is mapped to the last 11 orthogonal frequency division multiplexing OFDM symbols in the first subframe, a third sequence in the second sequence is mapped to the first M OFDM symbols in the first subframe, the first sequence is a wake-up signal WUS sequence in an in-band deployment mode, the third sequence is a sequence other than the first sequence in the second sequence, and M is an integer greater than 0 and less than 4; and the processor 901 is configured to perform sequence detection in the first subframe.

For other steps performed by the terminal device 900, refer to descriptions in step 501 to step 505. Details are not described herein again.

Figure 10:
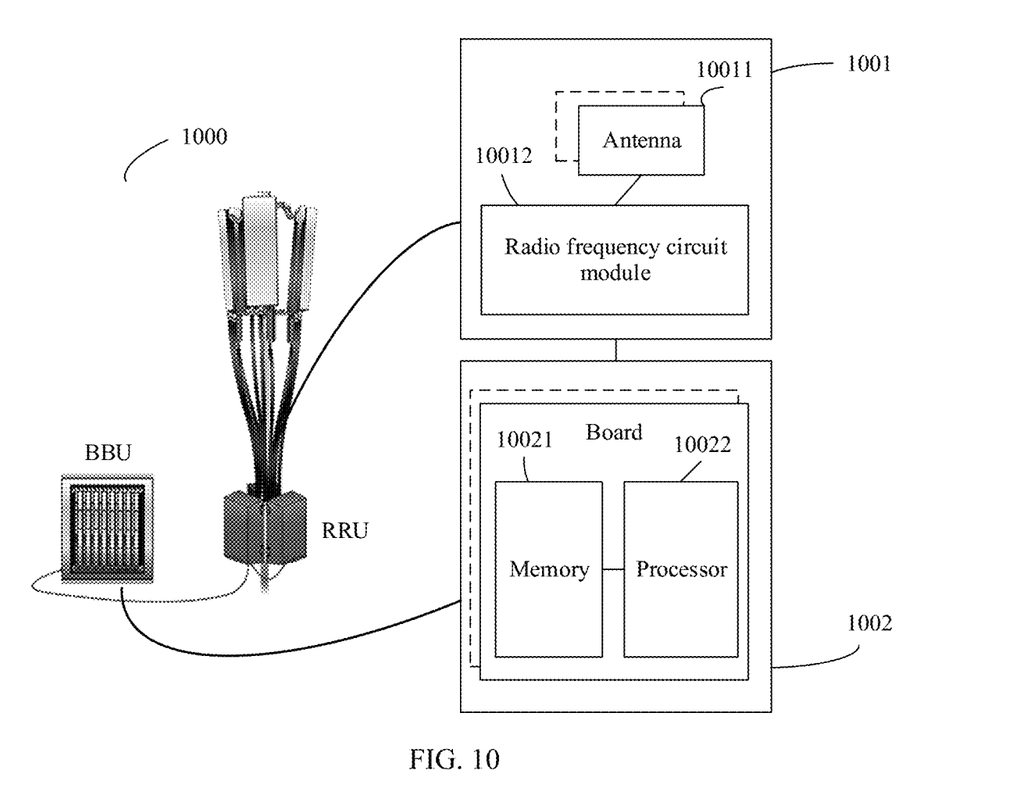
FIG. 10 is a schematic structural diagram of a network device according to an embodiment of this application.

FIG. 10 is a schematic structural diagram of a network device. The network device may be configured to perform actions of the network device in the foregoing method embodiments. The network device 1000 includes one or more remote radio units (remote radio unit, RRU) 1001 and one or more baseband units (baseband unit, BBU) 1002. The RRU 1001 may be referred to as a transceiver unit, a transceiver, a transceiver circuit, a transceiver machine, or the like, and may include at least one antenna 10011 and a radio frequency circuit module 10012. The RRU 1001 is mainly configured to: send and receive a radio frequency signal, and perform conversion between the radio frequency signal and a baseband signal, for example, configured to send the signaling indication or the reference signal in the foregoing embodiments to a terminal. The BBU 1002 is mainly configured to: perform baseband processing, control the network device, and so on. The RRU 1001 and the BBU 1002 may be physically disposed together, or may be physically separated, namely, a distributed base station.

The BBU 1002 is a control center of the network device, may be referred to as a processing unit, and is mainly configured to complete baseband processing functions such as channel coding, multiplexing, modulation, and spectrum spreading. In an example, the BBU 1002 may include one or more boards, and a plurality of boards may jointly support a radio access network (for example, a 5G network) in a single access standard, or may separately support radio access networks in different access standards. The BBU 1002 further includes a memory 10021 and a processor 10022. The memory 10021 is configured to store a necessary instruction and necessary data. The processor 10022 is configured to control the network device to perform a necessary action. The memory 10021 and the processor 10022 may serve one or more boards. In other words, a memory and a processor may be disposed on each board. Alternatively, a plurality of boards may share a same memory and processor. In addition, a necessary circuit is further disposed on each board.

When the network device 1000 performs actions of the network device in the process shown in FIG. 2, the processor 10022 is configured to: generate a first sequence, where the first sequence is a wake-up signal WUS sequence in an in-band deployment mode; and map the first sequence to the last 11 orthogonal frequency division multiplexing OFDM symbols in a first subframe, and map, to the first M OFDM symbols in the first subframe sequentially, a sequence that belongs to the first sequence and that is to be mapped to a first OFDM symbol to an $M^{th}$ OFDM symbol, where the first OFDM symbol to the $M^{th}$ OFDM symbol are M OFDM symbols of the last N OFDM symbols in the first subframe, N is greater than or equal to M, N is an integer greater than 0 and less than 12, and M is an integer greater than 0 and less than 4; and the radio frequency circuit module 10012 is configured to send the first subframe.

For other steps performed by the network device 1000, refer to descriptions in step 201 to step 205. Details are not described herein again.

When the network device 1000 performs actions of the network device in the process shown in FIG. 5, the processor 10022 is configured to: generate a second sequence, where the second sequence includes a first sequence and a third sequence, the first sequence is a wake-up signal WUS sequence in an in-band deployment mode, and the third sequence is a sequence other than the first sequence in the second sequence; and map the first sequence in the second sequence to the last 11 orthogonal frequency division multiplexing OFDM symbols in a first subframe, and map the third sequence to the first M OFDM symbols in the first subframe, where M is an integer greater than 0 and less than 4; and the radio frequency circuit module 10012 is configured to send the first subframe.

For other steps performed by the network device 1000, refer to descriptions in step 501 to step 505. Details are not described herein again.

For related parts between the method embodiments of this application, refer to each other. The apparatus provided in each apparatus embodiment is configured to perform the method provided in the corresponding method embodiment. Therefore, each apparatus embodiment may be understood with reference to a related part in a related method embodiment.

A person of ordinary skill in the art may understand that all or some of the steps in the method for implementing the foregoing embodiments may be completed by a program instructing related hardware. The program may be stored in a readable storage medium in a device. When the program is run, all or some of the steps described above are performed. The storage medium is, for example, a magnetic disk storage or an optical storage.

In the foregoing specific implementations, the objectives, the technical solutions, and the beneficial effects of this application are further described in detail. It should be understood that different embodiments can be combined. The foregoing descriptions are merely specific implementations of this application, but are not intended to limit the protection scope of this application. Any combination, modification, equivalent replacement, or improvement made without departing from the spirit and principle of this application should fall within the protection scope of this application.

What is claimed is:

1. A signal sending method, applied to a guard-band (GB) deployment mode or a standalone (SA) deployment mode, and comprising:

generating, by a network device, a first sequence, wherein a length of the first sequence is 132;

mapping, by the network device, the first sequence to a last 11 orthogonal frequency division multiplexing (OFDM) symbols in a first subframe, and mapping, a second sequence that belongs to the first sequence, to a first M OFDM symbols in the first subframe sequentially, wherein the second sequence is a sequence that is mapped to M OFDM symbols in a last N OFDM symbols of the first subframe, N is greater than or equal to M, N is an integer greater than 0 and less than 12, and M is an integer greater than 0 and less than 4; and sending, by the network device, the first subframe, wherein the first sequence satisfies the following formula: $w(n)=c(m)\cdot e^{-j2\pi\theta n}\cdot e^{-j\pi un'(n'+1)/l_z}$, wherein $c(m)$ is a resource element level (RE-level) scrambling sequence, $e^{-j2\pi\theta n}$ is a phase shift, $e^{-j\pi un'(n'+1)/l_z}$ is a Zadoff-Chu (ZC) sequence whose root index is u and whose length is $l_z$, $n'=n \bmod l_z$, $m=n \bmod l_c$, $l_c$ is a length of $c(m)$, and mod is a modulo operation; or wherein the first sequence satisfies the following formula: $w(n)=c(m)\cdot e^{-j\pi un'(n'+1)/l_z}$, wherein $c(m)$ is the RE-level scrambling sequence, $e^{-j\pi un'(n'+1)/l_z}$ is a ZC sequence whose root index is u and whose length is $l_z$, $n'=n \bmod l_z$, $m=n \bmod l_c$, $l_c$ is the length of $c(m)$, and mod is the modulo operation, wherein the length of the ZC sequence is 131, and a length of the RE-level scrambling sequence is 132.

2. The method according to claim 1, wherein at least one of the M OFDM symbols is an OFDM symbol that does not comprise a reference signal.

3. The method according to claim 1, wherein OFDM symbols in the first subframe are sequentially an OFDM symbol 0 to an OFDM symbol 13 in a time sequence;

a first OFDM symbol to an $M^{th}$ OFDM symbol are M OFDM symbols of the following OFDM symbols in the first subframe:

the OFDM symbol 3, the OFDM symbol 4, the OFDM symbol 7, the OFDM symbol 8, the OFDM symbol 9, the OFDM symbol 10, and the OFDM symbol 11.

4. The method according to claim 1, wherein a value of M is 3, and the value of N is 11.

5. The method according to claim 1, wherein OFDM symbols in the first subframe are sequentially an OFDM symbol 0 to an OFDM symbol 13 in a time sequence; and a value of M is 3, a value of N is 11, and a first OFDM symbol to an $M^{th}$ OFDM symbol are the OFDM symbol 7, the OFDM symbol 8, and the OFDM symbol 9.

6. The method according to claim 1, wherein the first sequence is the same as a wake-up signal (WUS) sequence in an in-band deployment mode.

7. A signal receiving method, applied to a guard-band (GB) deployment mode or a standalone (SA) deployment mode, and comprising:

receiving, by a terminal device, a first subframe from a network device, wherein a first sequence is mapped to a last 11 orthogonal frequency division multiplexing (OFDM) symbols in the first subframe, a length of the first sequence is 132, a second sequence that belongs to the first sequence is mapped to M OFDM symbols in a last N OFDM symbols of the first subframe, N is greater than or equal to M, N is an integer greater than 0 and less than 12, M is an integer greater than 0 and less than 4; and performing, by the terminal device, sequence detection in the first subframe, wherein the first sequence satisfies the following formula: $w(n)=c(m)\cdot e^{-j2\pi\theta n}\cdot e^{-j\pi un'(n'+1)/l_z}$, wherein $c(m)$ is a resource element level (RE-level) scrambling sequence, $e^{-j2\pi\theta n}$ is a phase shift, $e^{-j\pi un'(n'+1)/l_z}$ is a Zadoff-Chu (ZC) sequence whose root index is u and whose length is $l_z$, $n'=n \bmod l_z$, $m=n \bmod l_c$, $l_c$ is a length of $c(m)$, and mod is a modulo operation; or wherein the first sequence satisfies the following formula: $w(n)=c(m)\cdot e^{-j\pi un'(n'+1)/l_z}$, wherein $c(m)$ is the RE-level scrambling sequence, $e^{-j\pi un'(n'+1)/l_z}$ is the ZC sequence whose root index is u and whose length is $l_z$, $n'=n \bmod l_z$, $m=n \bmod l_c$, $l_c$ is the length of $c(m)$, and mod is the modulo operation, wherein the length of the ZC sequence is 131, and a length of the RE-level scrambling sequence is 132.

8. The method according to claim 7, wherein at least one of the M OFDM symbols is an OFDM symbol that does not comprise a reference signal.

9. The method according to claim 7, wherein OFDM symbols in the first subframe are sequentially an OFDM symbol 0 to an OFDM symbol 13 in a time sequence;
a first OFDM symbol to an $M^{th}$ OFDM symbol are M OFDM symbols of the following OFDM symbols in the first subframe:
the OFDM symbol 3, the OFDM symbol 4, the OFDM symbol 7, the OFDM symbol 8, the OFDM symbol 9, the OFDM symbol 10, and the OFDM symbol 11.

10. The method according to claim 7, wherein a value of M is 3, and the value of N is 11.

11. The method according to claim 7, wherein OFDM symbols in the first subframe are sequentially an OFDM symbol 0 to an OFDM symbol 13 in a time sequence; and
a value of M is 3, a value of N is 11, and a first OFDM symbol to an $M^{th}$ OFDM symbol are the OFDM symbol 7, the OFDM symbol 8, and the OFDM symbol 9.

12. The method according to claim 7, wherein the performing, by the terminal device, sequence detection in the first subframe comprises:
performing, by the terminal device, the sequence detection on the last 11 OFDM symbols in the first subframe; or
performing, by the terminal device, the sequence detection on all OFDM symbols in the first subframe.

13. The method according to claim 7, wherein the first sequence is the same as a wake-up signal (WUS) sequence in an in-band deployment mode.

14. A network device, applied to a guard-band (GB) deployment mode or a standalone (SA) deployment mode, and comprising:
a processor, configured to: generate a first sequence, wherein a length of the first sequence is 132; and map the first sequence to a last 11 orthogonal frequency division multiplexing (OFDM) symbols in a first subframe, and map, to a first M OFDM symbols in the first subframe sequentially, a second sequence that belongs to the first sequence, wherein the second sequence is a sequence that is mapped to M OFDM symbols in a last N OFDM symbols of the first subframe, N is greater than or equal to M, N is an integer greater than 0 and less than 12, and M is an integer greater than 0 and less than 4; and
a transceiver, configured to send the first subframe,
wherein the first sequence satisfies the following formula:
$w(n)=c(m)\cdot e^{-j2\pi\theta n}\cdot e^{-j\pi u n'(n'+1)/l_z}$, wherein c(m) is a resource element level (RE-level) scrambling sequence, $e^{-j2\pi\theta n}$ is a phase shift, $e^{-j\pi u n'(n'+1)/l_z}$ is a Zadoff-Chu (ZC) sequence whose root index is u and whose length is $l_z$, n'=n mod $l_z$, m=n mod $l_c$, $l_c$ is a length of c(m), and mod is a modulo operation: or
wherein the first sequence satisfies the following formula: $w(n)=c(m)\cdot e^{-j\pi u n'(n'+1)/l_z}$, wherein c(m) is the RE-level scrambling sequence, $e^{-j\pi u n'(n'+1)/l_z}$ is the ZC sequence whose root index is u and whose length is $l_z$, n'=n mod $l_z$, m=n mod $l_c$, $l_c$ is the length of c(m), and mod is the modulo operation,
wherein the length of the ZC sequence is 131, and a length of the RE-level scrambling sequence is 132.

15. The device according to claim 14, wherein at least one of the M OFDM symbols is an OFDM symbol that does not comprise a reference signal.

16. The device according to claim 14, wherein OFDM symbols in the first subframe are sequentially an OFDM symbol 0 to an OFDM symbol 13 in a time sequence; and
a value of M is 3, a value of N is 11, and a first OFDM symbol to an $M^{th}$ OFDM symbol are the OFDM symbol 7, the OFDM symbol 8, and the OFDM symbol 9.

17. A communications apparatus, applied to a guard-band (GB) deployment mode or a standalone (SA) deployment mode, and comprising:
a transceiver, configured to receive a first subframe from a network device, wherein a first sequence is mapped to a last 11 orthogonal frequency division multiplexing (OFDM) symbols in the first subframe, a length of the first sequence is 132, a second sequence that belongs to the first sequence is mapped to M OFDM symbols in a last N OFDM symbols of the first subframe, N is greater than or equal to M, N is an integer greater than 0 and less than 12, M is an integer greater than 0 and less than 4; and
a processor, configured to perform sequence detection in the first subframe,
wherein the first sequence satisfies the following formula:
$w(n)=c(m)\cdot e^{-j2\pi\theta n}\cdot e^{-j\pi u n'(n'+1)/l_z}$, wherein c(m) is a resource element level (RE-level) scrambling sequence, $e^{-j2\pi\theta n}$ is a phase shift, $e^{-j\pi u n'(n'+1)/l_z}$ is a Zadoff-Chu (ZC) sequence whose root index is u and whose length is $l_z$, n'=n mod $l_z$, m=n mod $l_c$, $l_c$ is a length of c(m), and mod is a modulo operation; or
wherein the first sequence satisfies the following formula: $w(n)=c(m)\cdot e^{-j\pi u n'(n'+1)/l_z}$, wherein c(m) is the RE-level scrambling sequence, $e^{-j\pi u n'(n'+1)/l_z}$ is the ZC sequence whose root index is u and whose length is $l_z$, n'=n mod $l_z$, m=n mod $l_c$, $l_c$ is the length of c(m), and mod is the modulo operation,
wherein the length of the ZC sequence is 131, and a length of the RE-level scrambling sequence is 132.

18. The apparatus according to claim 17, wherein OFDM symbols in the first subframe are sequentially an OFDM symbol 0 to an OFDM symbol 13 in a time sequence; and
a value of M is 3, a value of N is 11, and a first OFDM symbol to an $M^{th}$ OFDM symbol are the OFDM symbol 7, the OFDM symbol 8, and the OFDM symbol 9.

* * * * *

UNITED STATES PATENT AND TRADEMARK OFFICE
CERTIFICATE OF CORRECTION

PATENT NO. : 11,997,027 B2
APPLICATION NO. : 17/095523
DATED : May 28, 2024
INVENTOR(S) : Mi et al.

It is certified that error appears in the above-identified patent and that said Letters Patent is hereby corrected as shown below:

In the Claims

Claim 7, Column 18, Line 56: "length of c(m), and mod is a modulo operation: or" should read -- length of c(m), and mod is a modulo operation; or --.

Claim 14, Column 19, Line 51: "length of c(m), and mod is a modulo operation: or" should read -- length of c(m), and mod is a modulo operation; or --.

Signed and Sealed this
Fifteenth Day of April, 2025

Coke Morgan Stewart
*Acting Director of the United States Patent and Trademark Office*